ARRANGEMENT FOR TRIPPING RINGING IN INTERCEPT CIRCUIT
Filed May 11, 1966
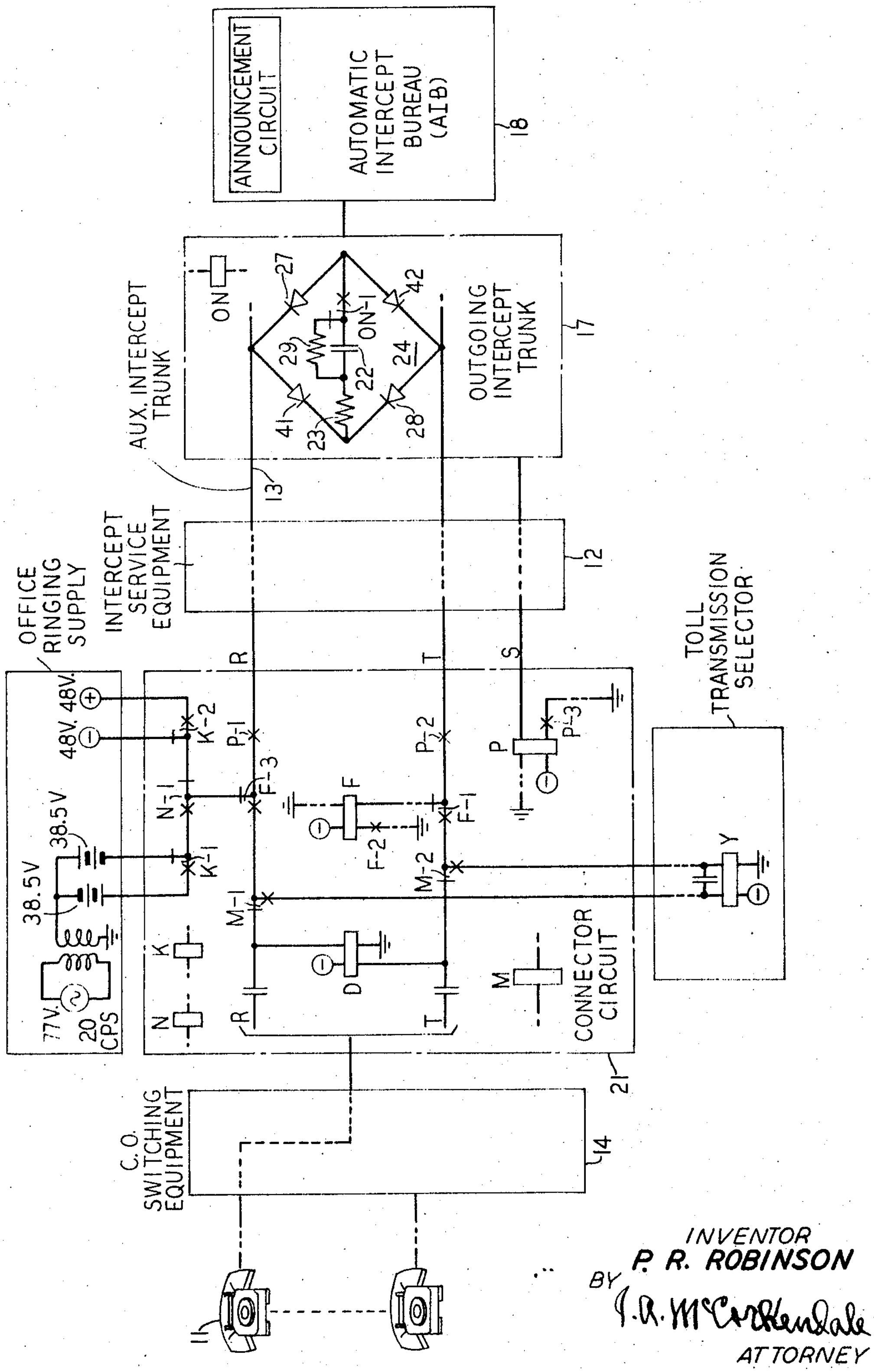
INVENTOR
P. R. ROBINSON
BY
J. R. McCorkendale
ATTORNEY United States Patent Office 3,445,603
Patented May 20, 1969

3,445,603

ARRANGEMENT FOR TRIPPING RINGING IN INTERCEPT CIRCUIT

Peter R. Robinson, Monmouth, N.J., assignor to Bell Telephone Laboratories, Incorporated, Murray Hill, N.J., a corporation of New York Filed May 11, 1966, Ser. No. 549,320
Int. Cl. H04m *3/60, 3/02, 3/52*
U.S. Cl. 179—18 10 Claims

ABSTRACT OF THE DISCLOSURE

A circuit for tripping ringing before an announcement is applied to an intercept telephone line employing a full wave rectifier bridge to ensure a unidirectional flow of charging current to a capacitor in series with the tripping relay regardless of the particular polarity of the potential applied to the line.

This invention relates to a circuit for tripping ringing on a telephone line and particularly to such a circuit which is effective to trip the ringing immediately upon indication of a predetermined circuit condition.

In the use of various types of present day telephone circuits, it has become apparent that there is need for means for tripping the ringing on a telephone line upon indication of a predetermined circuit condition that will be free of the measurable delay in operation which is true of many previously known tripping circuits. In most instances this delay results from the fact that, in the instance of many of these previously known circuits, tripping has been affected only during a ringing interval when ringing potential is present on the line and not during the silent interval which may, of course, precede the ringing interval in point of time. A ringing cycle comprises a silent interval and a ringing interval in alternate succession. During a ringing interval AC ringing potential is applied to the line, frequently superimposed on DC, while a DC potential usually of lesser voltage, is ordinarily applied to the line during the silent interval.

One illustrative type of telephone facility in connection with which a rapid-response tripping circuit is particularly desirable is an automatic intercept system of the general nature disclosed in Patent 3,143,601 issued Aug. 4, 1964 to A. E. Joel, Jr., and in the copending application of B. E. McCaffrey et al., Ser. No. 514,610, filed Dec. 17, 1965, "Automatic Number Intercept Identification System," now Patent No. 3,426,156, issued Feb. 4, 1969.

Under certain conditions, for example, when a subscriber has recently been assigned a new directory number and the previous number has not yet been reassigned, it is usual to intercept calls to the original number and, without marking the call for charging, to advise the calling party of the number change. As fully described in the above-identified patent and application, the intercepted call is ordinarily routed over an auxiliary intercept trunk to a central area commonly termed Automatic Intercept Bureau and referred to hereinafter as AIB. Here, after certain processing, an announcement is prepared and transmitted back to the calling subscriber. The transmission path includes a connector circuit which includes means for applying ringing potential to the called terminal. However, for reasons involved in the referred to processing steps, it is desirable that the connector not be placed in the ringing condition until the processing steps have been completed and the announcement is ready to be applied to the called terminal. At this point the outgoing trunk signals the connector circuit to change to the ringing condition. At the same time the output trunk also causes the connector to advance from the ringing condition to the talking condition, that is to cut-through to the calling subscriber, and the announcement is applied to the called terminal. In the type of connector circuit ordinarily involved tripping of the ringing and cut-through of the transmission path is a concurrent action under control of the same relay operation. Since it is desirable for purposes of economic equipment usage that the announcement be applied to the called terminal as quickly as possible after the processing has been completed and the connector circuit signaled for cut-through, it has been found that a vital, opening portion of the prepared announcement is frequently lost to the calling party due to the fact that the ringing has not been tripped and the connector circuit cut-through prior to the start of the announcement.

Accordingly it is an object of the present invention to improve the operation of tripping circuits.

Another object of the invention is to prevent the loss of portions of an announcement applied to a telephone line due to a delayed cut-through of the connector transmission path.

A more specific object of the invention is to enhance the operation of tripping circuits for ringing particularly with regard to the reduction in the delay of the operation thereof.

A further specific object of the invention is to render operation of a tripping circuit for ringing effective either during silent or ringing intervals.

A still further specific object of the invention is to make a tripping circuit for ringing compatible with various different types of ringing voltages.

In accordance with a specific embodiment of the invention a relatively large value capacitor is connected across the tip and ring of a called terminal when the ringing is to be tripped and the transmission path cut-through between the calling subscriber and the called terminal to which an announcement is to be applied. This capacitor is normally maintained in discharged condition, and, immediately upon its connection across the called terminal, a large flow of current passes through it, this being true either of the DC potential during the silent interval or the ringing potential, so that the surge of current occurs during either the silent or the ringing interval. This flow of current operates the tripping relay whereby the ringing ceases and the transmission path is cut-through. However, by the time the answer supervisory relay has been connected to the called terminal the capacitor has been fully charged, or substantially fully charged, and the resulting reduced current flow is insufficient to operate the supervisory relay. Accordingly the call is not marked for charging as would ordinarily occur when the ringing is tripped. (The terms "line," "called line," "called terminals" and the like may be used interchangeably herein.)

A feature of the invention is a rectifier network connected in association with the capacitor whereby to render the charging path compatible with various different types of ringing potentials.

A further feature of the invention is means associated with the capacitor for normally maintaining it in discharged condition.

A full understanding of the arrangement contemplated by the present invention as well as an appreciation of the various advantageous features thereof may be gained from consideration of the following detailed description in connection with the accompanying drawing, the single figure of which shows one specific illustrative embodiment of the tripping circuit contemplated by the invention applied in connection with telephone intercept service.

Referring now to the drawing, it will be assumed for purposes of description that the calling station 11 has attempted to call a line which has been placed on intercept due to the fact, for example, that the directory number is not presently assigned and that a different number has been assigned to the previously associated line.

It will be assumed that the called line has been "placed on intercept" as fully explained in the above-identified patent and application and that its connector multiple terminals have been connected through the intercept service equipment 12 to auxiliary intercept trunk 13. It will be understood, of course, that the calling station 11 has reached the connector multiple terminals of the number dialed through the central office switching equipment 14 in the usual manner.

The call is extended via the intercept service equipment 12 and the auxiliary intercept trunk 13 to outgoing intercept trunk 17 which, in turn, repeats the seizure signal to the automatic intercept bureau (AIB) 18. As previously set forth above, it is important up to this point, that is, until completion of the processing steps, that the transmission path between the AIB 18 and the calling party remain open. This path includes connector circuit 21, and it will be noted that at this point the connector circuit is in a terminal seized but not "ringing" condition and is not cut-through for "talking" connection to the calling subscriber as the cut-through relay P and the tripping relay F have not operated and the tip and ring conductors of the path are open at the make contacts of respective transfer pairs F–1 and F–3, and make contacts P–1 and P–2. When the processing steps have been completed, the outgoing trunk 17 will signal the connector circuit to switch to the ringing condition by causing the operation of relay P and closing of the P–1 and P–2 make contacts. The outgoing trunk will further cause the connector to trip the ringing and cut-through to the calling subscriber as subsequently described.

Connector circuit 21 is of a general type well known in the art and has been illustrated, and will be described in detail, only to the extent required for full disclosure of the present invention. It will be understood that relay F controls the dual function of tripping the ringing and cutting through the transmission path, and that relay D is the "answer supervision" relay which, when operated, initiates action for marking the call as completed for charging. As will be described in detail subsequently, various different types of potentials are applied to the line through this connector circuit depending upon the types of ringing potentials, the intervals (ringing or silent), the nature of the completion (local or toll), and so on.

Assuming now that the necessary processing steps have been completed in AIB 18 as set forth in the above-identified patent and application, the connector circuit 21 is signaled in an appropriate manner through outgoing intercept trunk 17 to change from a ringing to a talking condition, that is to trip the ringing and to cut-through the tip and ring of the called terminal to the calling subscriber. It will be assumed for purposes of description that connector circuit 21 is first switched to the ringing condition by causing operation of relay P whereby to close the tip and ring at make contacts P–1 and P–2 respectively.

Capacitor 22, preferably of relatively large value, for example, of the order of 50 mf., in series with current limiting resistor 23, is connected across two terminals of a full wave rectifier bridge 24; the tip and ring leads of the connector circuit are connected across the remaining two terminals of the bridge. Relay ON operates when the bridge network is seized so that the shunting path for capacitor 22 through resistor 29 is open at the break contact of transfer pair ON–1. (During periods when the bridge network is not in use this shunt path is closed whereby to maintain capacitor 22 in discharged condition.)

It will be noted that when the capacitor 22 is connected across the tip and ring by closing of contacts P–1 and P–2, any one of several different potentials may be present on the line. For example, it will be assumed first that the P–1 and P–2 contacts are closed during a silent interval of the ringing cycle at which time relay N is in released position due to the inherent operations of the associated circuits. Accordingly either −48 v. or +48 v. will be applied to the line depending upon the operated or released condition of relay K. (Relay K operates under control of an interrupter whereby to provide coded ringing in spaced steps.) It will be assumed, first, that relay K is released in which event −48 v. will be applied to the ring side of the line through the break contacts of respective transfer pairs K–2, N–1 and F–3 and will be applied to the full wave rectifier bridge 24 through contact P–1.

Since capacitor 22 is in a fully discharged condition and is of relatively large capacity a surge of current passes over the line through diode 27, make contact of transfer pair ON–1, capacitor 22, resistor 23, diode 28, make contact P–2, break contact of transfer pair F–1, right hand winding of relay F to ground. Relay F operates on this surge of current and locks through its make contact F–2 to ground over a path not shown in detail.

Relay F, operated, cuts through the line to the calling party at the make contacts of respective transfer pair F–3 and F–1 and "trips" the ringing, that is removes the ringing potential from the line at the break contacts of the same transfer pairs. It will be apparent, therefore, that the line is cut-through without delay when the signal is received from outgoing intercept trunk 17 indicating that the announcement is to be applied to the line and, further, that this cut-through is in nowise delayed by the circumstance that the signal was received during a silent interval of the ringing cycle. The inclusion of the large value capacitor 22, in normally discharged condition, in the path assures a "quick" flow of current for operating relay F even during the silent intervals of the ringing cycle when only the 48 volt potential is applied to the line.

Assuming now that the signal from outgoing intercept trunk 17 is received and contacts P–1 and P–2 are closed still during a silent interval but during a period when relay K is operated, +48 v. will then be applied to the line through the make contact of transfer pair K–2 and the break contacts of respective transfer pairs N–1 and F–3. The relay F will be operated as before but in this instance for the oppositely poled potential the charging path of capacitor 22 will be traced through diode 42, make contact of transfer pair ON–1, capacitor 22, resistor 23 and diode 41.

It will be apparent that the novel tripping arrangement, in effect, embodies two major elements the large value capacitor to provide the initial surge path and the full wave rectifier bridge which renders the path through the capacitor compatible to oppositely poled potentials and assures a unidirectional charging path for the capacitor regardless of the polarity of the ringing or silent interval potential.

In the event the alerting signal is received from outgoint intercept trunk 17 and contacts P–1 and P–2 are closed during a ringing interval (when relay N is in operated position) 77 v. AC will be connected to the line superimposed either on +38.5 v. DC if relay K is operated or superimposed on −38.5 v. DC if relay K is released. In either event the F relay will operate without delay over the path through capacitor 22, the charging path being via diodes 27 and 28 in the instance of superimposed minus (−) DC and via diodes 42 and 41 in the instance of superimposed plus (+) DC.

It will be observed that when relay F has operated the two windings of relay D are connected through capacitor 22 (provided relay M is in released position). It is not desired that relay D operate at this time however since this is the "answer supervision" relay and, if operated, the intercepted call would be marked as "completed" for call charging. The novel arrangement of the tripping circuit is such that relay D does not, in fact, operate.

At the time the contacts P–1 and P–2 were first closed, capacitor 22 was in fully discharged condition whereby to provide a surge path for the potential applied to the line so that the current flow under any of the various situations encountered would be sufficient to operate relay F. However, by the time relay F operated and closed the tip and ring at the make contacts of respective transfer pairs F–3 and F–1, capacitor 22 has reached a fully charged condition, or substantially so, and the path now provided for current flow is of substantially higher resistance. As a result, the current flow through the windings of relay D is insufficient to cause its operation and the relay remains in nonoperated position.

The condition shown with relay M in released condition and relay D connected across the called terminal is that prevailing on locally originated calls; in the event of a toll call relay M will be in operated condition and relay Y of the toll transmission selector will be connected across the called terminal instead of relay D. It will be observed that the polarity of the two relays is respectively opposite with regard to their connections to the called terminal.

After capacitor 22 has been charged and relay D (or relay Y) has been connected across the called terminal it is important, of course, that the capacitor be prevented from discharging back over the tip and ring leads through the relay winding. Such action is prevented by the novel rectifier bridge arrangement associated with the capacitor since the diode paths permit only the single direction current flow in the charge direction and block an opposite current flow which would result from capacitor discharge. Capacitor 22 can discharge only after the circuit has been released and off-normal relay ON has been released. At this point the charge is dissipated through resistor 29 and the capacitor is restored to a fully discharged condition for the next seizure.

While the tripping circuit has been disclosed in connection with telephone intercept service as one illustrative application, it should be understood that it is applicable when ever prompt tripping is desirable following establishment of a particular circuit condition and where different types of potentials are applied to the connection. An important feature is that tripping operation can occur on a silent interval, if such interval happens to come first, and need not await first ringing interval as was necessary in most previously known tripping circuits. It is to be understood that the above-described arrangements are illustrative of the application of the principles of the invention. Numerous other arrangements may be devised by those skilled in the art without departing from the spirit and scope of the invention.

What is claimed is:

1. In a telephone system, a line, means for applying different potentials to said line during a ringing cycle, said potentials having one value during the silent intervals of said cycle and a different value during the ringing intervals of said cycle, said potentials also being of either polarity during both said silent intervals and said ringing intervals, a tripping relay connected to said line effective when operated to remove said potentials from the line, means for operating said relay, said operating means including a capacitor connected across said line chargeable by the potentials applied to said line, and means for ensuring a unidirectional flow of charging current through the capacitor regardless of the particular polarity of the potential applied to the line at a given moment.

2. In a telephone system the combination defined by claim 1 further characterized in that said last-mentioned means includes a full wave rectifier bridge, said capacitor being connected across two terminals of said bridge, and the two sides of said line being connected respectively to the other two terminals of the bridge.

3. In a telephone system the combination defined by claim 2 further characterized in that said capacitor is included as a series element in the operate path of said relay and has such characteristics when in discharged or only partially charged condition as to permit sufficient current flow in said path to operate said relay when potential of either said one value or said different value is applied to said line.

4. In a telephone system, the combination defined by claim 3 further characterized in that said line is normally in open condition and that operation of said relay is also effective to close said line.

5. In a telephone system the combination defined by claim 4 further characterized in a second relay connected across said line, and a potential source for operating said second relay, said capacitor also being included as a series element in an operate path of said second relay when said line is closed, the characteristics of said capacitor when in charged condition being such that insufficient current flow is permitted in said last-mentioned operate path to operate said second relay.

6: In a telephone system the combination defined by claim 5 further characterized in means for preventing discharge of said capacitor over said line when said line is closed said last-mentioned means including portions of said rectifier bridge.

7. In a telephone system the combination defined by claim 6 further characterized in means for maintaining said capacitor in fully discharged condition during periods when said line is in normal, unseized condition.

8. In a telephone system the combination defined by claim 7 further characterized in that said last-mentioned means includes a resistor and means for connecting said resistor in shunt to said capacitor.

9. In a telephone system, plurality of lines each having a corresponding directory number, means for completing a connection between a calling one of said lines and a called one of said lines, means for applying ringing potential to each of said lines when in called condition to ring on said line, said ringing potential being of either polarity, means for intercepting a call from a calling line to one of said lines and for applying an announcement to said calling line, and means effective prior to said announcement for tripping the ringing on said intercepted calling line, said last-mentioned means including a capacitor connected across said line chargeable by the ringing potential applied thereto, and means for ensuring a unidirectional flow of current through the capacitor regardless of the particular directional characteristics of the ringing potentials applied to said line.

10. In a telephone system a plurality of lines, switching means for establishing a connection between a calling one of said lines and a called one of said lines, means for applying ringing potential to said lines when in a called condition, means including a first relay for tripping said ringing and means including a second relay for initiating the call charge for the connection to said called line, means for intercepting a call from a calling one of said lines and for applying an announcement to said one calling line, means including a capacitor connected in series with said first relay and effective prior to said announcement for tripping the ringing on said intercepting line in either the silent or ringing interval of said ringing potential, and means including a capacitor connected in series with said with said second relay to prevent operation of said second relay.

No references cited

KATHLEEN H. CLAFFY, *Primary Examiner.*

D. L. RAY, *Assistant Examiner.*

U.S. Cl. X.R.

179—27